(12) United States Patent
Burrows (10) Patent No.: US 6,271,631 B1
(45) Date of Patent: Aug. 7, 2001

(54) ALERTING SYSTEM USING ELASTOMERIC EL LAMP STRUCTURE

(75) Inventor: Kenneth Burrows, Pilot Point, TX (US)

(73) Assignee: E.L. Specialists, Inc., Plano, TX (US)

( * ) Notice: Subject to any disclaimer, the term of this patent is extended or adjusted under 35 U.S.C. 154(b) by 0 days.

(21) Appl. No.: 09/482,389

(22) Filed: Jan. 12, 2000

Related U.S. Application Data (63) Continuation-in-part of application No. 09/173,404, filed on Oct. 15, 1998.

(51) Int. Cl.$^7$ .................................................... G09G 3/10
(52) U.S. Cl. ...................... 315/169.3; 313/511; 313/512; 379/164; 428/690; 428/917
(58) Field of Search ................... 315/169.3; 379/164, 379/179, 373, 396, 433, 440; 313/511, 512; 40/544; 362/24, 88; 428/690, 917

(56) References Cited

U.S. PATENT DOCUMENTS

| | | | |
|---|---|---|---|
| 4,104,555 | 8/1978 | Fleming | 313/512 |
| 4,647,337 | 3/1987 | Simopoulos et al. | 156/633 |
| 4,684,353 | 8/1987 | deSouza | 445/51 |
| 5,041,326 | 8/1991 | Schroeder et al. | 428/161 |
| 5,184,969 | 2/1993 | Sharpless et al. | 445/24 |
| 5,336,345 | 8/1994 | Gustafson et al. | 156/67 |
| 5,491,377 | 2/1996 | Janusauskas | 313/506 |
| 5,496,427 | 3/1996 | Gustafson et al. | 156/67 |
| 5,559,680 | 9/1996 | Tabanera | 362/106 |
| 5,565,733 | * 10/1996 | Krafcik et al. | 40/544 |
| 5,572,817 | 11/1996 | Chien | 40/544 |
| 5,611,621 | 3/1997 | Chien | 362/84 |

(List continued on next page.)

FOREIGN PATENT DOCUMENTS 244702  10/1995  (JP).

OTHER PUBLICATIONS

International Publication No. WO 95/27417, filed Mar. 31, 1995 and published Oct. 19, 1995; Tseng–Lu Chien, "Shoe With An EL Light Strip."
European Patent Application No. 0 286 748 A1, filed Apr. 15, 1987 and published Oct. 19, 1988; Luminescent Electronics, Inc., "Electroluminescent Lamps and Panels."
International Publication No. WO 86/03460, filed Dec. 2, 1985 and published Jun. 19, 1986; Luminescent Electronics, Inc., "Electroluminescent Panels."
Supplementary European Search Report dated Jun. 7, 2000 filed in counterpart EP Application No. EP97953511.

*Primary Examiner*—Don Wong
*Assistant Examiner*—Thuy Vinh Tran
(74) *Attorney, Agent, or Firm*—Vinson & Elkins L.L.P.

(57) ABSTRACT

An elastomeric electroluminescent (EL) lamp is provided wherein an electroluminescent system, advantageously monolithic, is provided in an elastomeric structure. As a result, the lamp is thin, pliable and membrane-like. A first envelope layer is applied advantageously by screen printing to transfer release paper. An EL system is then applied, again advantageously by screen printing to the first envelope layer, and then a second envelope layer is applied to seal the EL system within the envelope. Appropriate windows are cut or left open to allow electrical contact with the EL system. An optional adhesive layer then may be applied if the lamp is to be used in transfer form for later affixation to a substrate. Alternatively, the lamp may be used as a self-contained membraneous component installed in another product such as a telephone handset. When used on a telephone, several addressable lamp segments may be deployed on the case of the telephone and caused to emit a visual alert when, for example, the telephone rings. This visual alert may then, if desired, be synchronized with an audible alert.

20 Claims, 3 Drawing Sheets

U.S. PATENT DOCUMENTS

| | | | |
|---|---|---|---|
| 5,701,189 | * 12/1997 | Koda et al. | 379/56 |
| 5,704,705 | 1/1998 | Chien | 362/84 |
| 5,746,501 | 5/1998 | Chien | 362/103 |
| 5,752,337 | 5/1998 | Chien | 40/540 |
| 5,770,920 | 6/1998 | Eckersley et al. | 313/506 |
| 5,794,366 | 8/1998 | Chien | 40/540 |
| 5,806,960 | 9/1998 | Chien | 362/84 |
| 5,811,930 | * 9/1998 | Krafcik et al. | 313/511 |
| 5,833,508 | 11/1998 | Chien | 445/24 |
| 5,836,671 | 11/1998 | Chien | 362/84 |
| 5,856,029 | * 1/1999 | Burrows | 428/690 |
| 5,856,030 | 1/1999 | Burrows | 428/690 |
| 5,856,031 | 1/1999 | Burrows | 428/690 |
| 5,860,727 | 1/1999 | Chien | 362/84 |
| 5,865,523 | 2/1999 | Chien | 362/84 |
| 5,871,271 | 2/1999 | Chien | 362/106 |

* cited by examiner

ALERTING SYSTEM USING ELASTOMERIC EL LAMP STRUCTURE

RELATED APPLICATIONS

This application is a continuation-in-part of commonly-assigned and co-pending U.S. patent application Method for Construction of Elastomeric EL Lamp, Ser. No. 09/173,404, filed Oct. 15, 1998.

Reference is further made to commonly-assigned U.S. Pat. No. 5,856,029, Electroluminescent System in Monolithic Structure, issued Jan. 5, 1999, the disclosure of which patent is incorporated herein by reference.

TECHNICAL FIELD OF THE INVENTION

This application relates generally to electroluminescent lamps, and more particularly to a self-contained membranous electroluminescent system provided on an appliance, such electroluminescent system being deployed in segments and generating an alert in response to a power pulse.

BACKGROUND OF THE INVENTION

An embodiment of the invention taught by the above-referenced U.S. patent application Electroluminescent System in Monolithic Structure (the "Previous Invention") is directed to an electroluminescent ("EL") system having a unitary carrier whose layers form a monolithic structure. A preferred unitary carrier in this system is a vinyl resin. One of the advantages of this monolithic electroluminescent system is that the layers thereof may be printed down as inks in a screen printing process onto a wide variety of substrates.

It is also known in the art that elastomeric structures have unique and useful properties. Behaving much like sturdy membranes, the malleability and ductility of elastomeric structures enable applications that would otherwise be unavailable to more rigid or plastic components.

There are many potentially advantageous applications of an elastomeric electroluminescent ("EL") lamp. For example, highly pliable and resilient backlit keyboard facia would be enabled in cellular telephones or other personal communications devices. Alternatively, lamp sections in membranous elastomeric form could be printed down onto selected sections of the telephone case itself. These sections could be caused to illuminate as part of a visual alert energized when the telephone rings.

Alternatively, elastomeric EL lamps could be constructed in transfer form and then affixed to fibrous substrates, such as fabric. Experimentation has shown that screen printing down EL systems in accordance with the Previous Invention on substrates such as fabric often requires pre-preparation of the substrate for best results. First, the fabric may not always be optimally chemically compatible with the first layer of the EL system. Second, fabric fibers have been found to tend to "stand up" and interfere with an even and uniform print down of the EL system. As a result, although the Previous Invention has been found to be fully functional on such fabrics, the quality of electroluminescence can suffer. It has therefore been found advantageous to preprint a "platform layer" of the unitary carrier (with no EL-active ingredients) onto fabric and similar substrates to inhibit these factors. The EL system is then printed down onto the platform layer in accordance with the Previous Invention.

Although providing this platform layer tends to enhance the performance of the EL lamp, it will be understood to be an additional manufacturing step with attendant time, material and manufacturing process costs.

Moreover, further experimentation with printing down the EL system according to the Previous Invention has also shown that printing works best when the area to receive the printing is flattened out into a plane. For fabric printing, for example, this "flattening" is easily accomplished with garments such as t-shirts, but is not so easy with other garments, such as jackets or baseball caps, for which a "flattening" step may damage or detract from the final appearance of the garment.

There is therefore a general need in the art for elastomeric EL lamps. Such elastomeric lamps would be advantageous as components in products requiring flexible backlighting or visual alert lighting. Alternatively, in transfer form, such elastomeric lamps could enable improved application of the EL system of the Previous Invention to fibrous substrates, including fabrics, without incurring the additional cost and manufacturing step of pre-preparing the substrate to receive the EL system. Elastomeric EL lamps could also facilitate application of the EL system of the Previous Invention less traumatically to substrates with three-dimensional shapes.

SUMMARY OF THE INVENTION

The present invention is directed to an EL lamp manufactured generally in accordance with the Previous Invention, but as a discrete elastomeric structure. This structure may, if desired, be subsequently affixed to a substrate so as to adopt the utility of a "transfer". Alternatively, the elastomeric structure may be used as a discrete, self-contained electroluminescent component in applications such as keyboard facia or visual alert mechanisms, where a thin, membrane-like EL lamp would be highly advantageous.

In accordance with the present invention, elastomeric EL lamps are manufactured entirely by using screen printing or other printing techniques. Screen printing costs and logistics under the present invention are therefore generally no more complex or involved than if the EL lamp is screen printed directly onto the substrate in accordance with the Previous Invention. Various advantages are gained, however, by constructing the lamp as an elastomeric structure. If the elastomeric structure is to be affixed to a substrate in the form of a transfer, the need to pre-prepare a fabric or other substrate with a platform layer is obviated. Further, elastomeric EL lamps in the form of transfers according to the present invention are extremely malleable and flexible, enabling subsequent affixation thereof to virtually any three-dimensionally shaped substrate without having to "flatten" an area to receive the printing process. Alternatively, if the elastomeric structure is to be used as a self-contained component, it may be mass-produced and then installed in a product potentially as easily as a gasket or other thin, membrane-like component.

In summary, an EL lamp in an elastomeric structure according to the present invention begins with printing a first envelope layer onto commercially available heavy-grade transfer release paper. Subsequent first envelope layers may be printed down to achieve a desired monolithic first envelope layer thickness. Further, one or more of the layers may be dyed and/or printed in a pattern so that the first layer of the envelope will, in natural light, have a predetermined appearance (such as a logo or keyboard facia layout).

The material of the first layer of the envelope is advantageously (although not required to be) a clear or semi-clear polyurethane. Experimentation has shown that this material has excellent elastomeric properties. Further, this material has been proven to be chemically stable with just about all the materials likely to be encountered in an EL lamp application, including the transfer release paper, the layers of an EL system, the adhesives by which a transfer may be affixed to the substrate, and with most substrates themselves, including fibrous substrates. Polyurethane also is an extremely flexible and malleable material, enabling manufacture of an elastomeric EL lamp that may be adapted or "wrapped" to be easily and nontraumatically receivable on just about any three-dimensionally shaped substrate.

Once the first layer of the envelope has been printed onto the transfer release paper, an EL system, advantageously (although not required to be) in accordance with the Previous Invention, is printed down onto the first envelope layer. The EL system is undersized on the first envelope layer in order to leave a first envelope border around the outside. A second envelope layer is then printed down on top of the EL system, combining around the edges with the first envelope border to seal the EL system within the envelope. Appropriate windows in the envelope are made, or left, to enable electrical contacts to be introduced into the EL system. Again, the second envelope layer is a polyurethane, advantageously printed in several intermediate layers to achieve a desired thickness. In achieving a desired thickness of polyurethane envelope, the design advantageously ensures that the EL lamp within the envelope is electrically isolated from the outside, and that the envelope is watertight.

When the elastomeric EL lamp is desired to be used as a transfer, a final heat-adhesive layer is optionally printed down or heat sealed in film form on top of the second envelope layer. The heat-adhesive layer may again advantageously be a polyurethane, although this is not a specific requirement. This heat-adhesive layer disposes the transfer to be affixed to a substrate by heat and pressure. Note, however, that the EL lamp as an elastomeric structure may also be affixed to the substrate by other means known in the art, such as contact adhesive, etc., in which case a heat-adhesive layer is not necessary. Further, when the elastomeric EL lamp is to be used as a self-contained component in another product, the heat-adhesive layer is also not likely to be necessary.

A preferred embodiment of the present invention may be applied to selected areas of the case of an appliance such as a telephone. Advantageously, a plurality of separate segments of membranous elastomeric EL lamp are provided on the case. These segments light up responsive to a power pulse that energizes selected segment concurrently and/or sequentially in a burst. This burst can be enabled at predetermined times, such as when the telephone rings, or on command when the user pushes a button. When enabled coincident with the telephone ringing, the burst forms a visual alert that may, if desired, be synchronized with a separate audible alert emitted by the telephone. Further, if desired, changes in the specific segments of EL lamp energized during the burst may be synchronized with predetermined events in the audible alert, such as changes in tone or sound.

It will therefore be seen that a technical advantage of the present invention is that as an elastomeric structure, the EL lamp may be made in transfer form and separately from the substrate surface (such as fabric) to which it is to be applied, obviating the need to pre-prepare the substrate surface before EL system application. The screen printing steps and cost implications of manufacturing the EL lamp as an elastomeric structure in the form of a transfer are nonetheless substantially equivalent to applying the EL system directly to the substrate itself. For an equivalent outlay of resources, therefore, a more versatile and reliable EL lamp may be applied to fibrous substrates, such as fabrics having various three-dimensional shapes.

A further technical advantage of the present invention is that the EL lamp as an elastomeric structure is extremely flexible and malleable. Accordingly, again in transfer form, it is readily disposed to be affixed quickly and easily to substrates with three-dimensional profiles, such as the front of a baseball hat. Alternatively, in the form of a self-contained component, it may be mass-produced and then easily and quickly installed in, for example, keyboard-requiring products such as portable telephones in which a shaped membrane keyboard would be highly advantageous.

A further technical advantage of the present invention is that the envelope may include dyed layers in colored patterns such as logos or other designs, so that the appearance of the EL lamp as an elastomeric structure cooperates visually in natural light with the appearance of the EL lamp when energized in subdued light.

It is a further technical advantage of the present invention to be able to mass produce large quantities of elastomeric EL lamps by printing down multiples thereof on to a single sheet of transfer release paper. The position of these multiple EL lamps on the release paper may be registered, allowing the EL lamps to be punched out of the release paper sheet in large multiples with a single stamp of the punch. This optimizes resources in the manufacture of EL lamps, and provides efficiency savings over traditional methods applying EL lamps individually directly to substrates.

A yet further technical advantage of the present invention is its suitability as an alert mechanism on an appliance such as a telephone. The invention functions well in this way either by itself, as a visual alert, or in combination with an audible alert.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
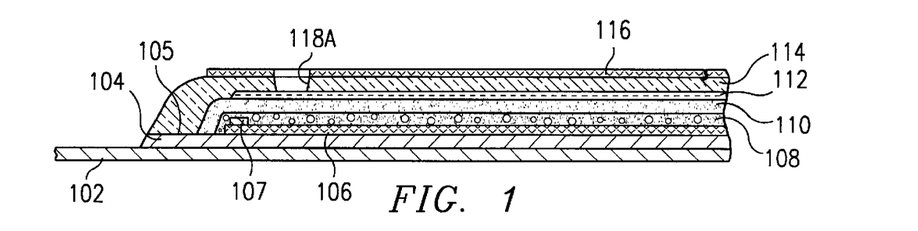
FIG. 1 is a cross-sectional view of a preferred embodiment of an elastomeric EL lamp according to the present invention.

FIG. 1 illustrates a cross-sectional view of a preferred embodiment of an EL lamp as an elastomeric structure according to the present invention. It will be seen by cross-reference with above-referenced U.S. patent application Electroluminescent System in Monolithic Structure that the active EL system illustrated in FIG. 1 is substantially as disclosed in said application, using a common unitary carrier such as vinyl initially applied in gel form. It will nonetheless be understood that the present invention has no specific requirements as to a particular EL system to be used herein, and that the scope of the present invention contemplates many different EL systems being enabled as elastomeric structures.

With reference now to FIG. 1, all layers are printed down on transfer release paper 102. In a preferred embodiment, transfer release paper 102 is as manufactured by Midland Paper-Aquatron Release Paper. It will also be understood that as an alternative to paper, transfer release film may be used consistent with the present invention.

All subsequent layers as shown on FIG. 1 (and subsequent Figures) are advantageously applied by screen printing processes known in the art. Once again, however, it will be understood that the present invention is not limited to providing elastomeric EL lamps whose layers have been applied solely by screen printing, and other methods of applying layers may be used to construct elastomeric EL lamps consistent with the present invention.

First envelope layer 104 is printed down onto transfer release paper 102. It may be advantageous to print first envelope layer 104 down in several intermediate layers to achieve a desired overall combined thickness. Printing first envelope layer 104 down in a series of intermediate layers also facilitates dying or other coloring of particular layers to achieve a desired natural light appearance of the EL lamp. First envelope layer 104 is advantageously (although not required to be) a polyurethane such as Nazdar DA 170 mixed in a 3:1 ratio with catalyst DA 176. This is a commercially available polyurethane ink intended for screen printing. As noted above, this polyurethane exhibits the desired elastomeric characteristics for the envelope layer, being chemically stable with other components of the EL lamp, and also extremely malleable and ductile. This polyurethane is further well disposed to be printed down in multiple layers to reach a monolithic final thickness when cured. Finally, this polyurethane is substantially colorless and generally clear, and so layers thereof are further well disposed to receive dying or other coloring treatments (as will be further described below) to provide an EL lamp whose appearance in natural light is designed to complement its active light appearance in subdued light.

Referring back now to FIG. 1, it will be seen that first envelope layer 104 is printed down onto transfer release paper 102 so as to provide a border 105 clear of the edge of EL system layers 106-112. This is so as to provide a zone on which second envelope layer 114 can bond to completely seal the EL system, the aspects of which will be described in greater detail below.

Now, advantageously in accordance with the disclosure of above-referenced U.S. patent application Electroluminescent System in Monolithic Structure, an EL system is next printed down onto first envelope layer 104. It will be seen that according to FIG. 1, the EL lamp is being constructed "face down," and so Indium Tin Oxide ("ITO") layer 106 is first printed down onto first envelope layer 104.

Front bus bar 107 (advantageously silver) is next printed down onto ITO layer 106. Electroluminescent layer 108 (advantageously a phosphor/barium titanate mixture) is then printed down onto ITO layer 106 and over front bus bar 107. Although not a specific requirement of the present invention, experimentation has shown improved performance when front bus bar 107 is disposed on top of ITO layer 106 rather than the reverse (ITO layer 106 printed down on top of front bus bar 107). This is because when ITO layer 106 is laid on top of the front bus bar 107, the vinyl carrier in ITO layer 106 has been found to tend to cure to form a barrier inhibiting conductivity with front bus bar 107 previously laid. This phenomenon appears not to occur in the reverse, however, and so front bus bar 107 is advantageously printed down onto ITO layer 106.

Referring again to FIG. 1, dielectric layer 110 (advantageously barium titanate) is printed down onto electroluminescent layer 108, and then back electrode layer 112 (advantageously silver or carbon) is printed down onto dielectric layer 110. Note that as disclosed in above-referenced U.S. patent application Electroluminescent System in Monolithic Structure, ITO layer 106, front bus bar 107, electroluminescent layer 108, dielectric layer 110, and back electrode layer 112 thus comprises an exemplary EL system enabling the electroluminescent properties of the present invention.

Turning again to FIG. 1, second envelope layer 114 is then printed down onto back electrode layer 112. It will be seen from FIG. 1 that EL system layers 106-112 are advantageously printed down leaving border 105 clear. This allows second envelope layer 114 to be printed down to bond to first envelope layer 104 around border 105, thereby sealing (1) the EL system in an envelope so as to isolate the EL system electrically and (2) making the entire EL lamp assembly substantially moisture proof. Second envelope layer 114 is advantageously also made from the same material as first envelope layer 104, so that when complete, the two components may combine to form a monolithic envelope around the EL system. As noted above, a suitable polyurethane is, for example, Nazdar DA 170 mixed in a 3:1 ratio with catalyst DA 176. Further, also as noted above, second envelope layer 114 may also be printed down in a series of intermediate layers to achieve a desired thickness.

The final (top) layer illustrated on FIG. 1 is an optional adhesive layer 116. As already described, one application of the elastomeric EL lamp of the present invention is as a transfer affixed to a substrate. In this case, the transfer may be affixed using a heat adhesive, although other affixing means may be used, such as contact adhesive. Heat adhesive has the advantage that it may be printed down using the same manufacturing processes as other layers of the assembly, and then the transfer may be stored or stocked, ready to be affixed subsequently to a substrate using a simple heat press technique. In this case, as illustrated on FIG. 1, adhesive layer 116 is printed down onto second envelope layer 114.

Of course, in other applications of the present invention where the elastomeric EL lamp is a self-contained component of another product, the optional adhesive layer 116 will likely not be necessary.

A further feature illustrated on FIG. 1 is rear contact window 118A. Clearly, in order for electric power to be brought in to energize EL system layers 106–112, rear contact window 118A is required through adhesive layer 116 and second envelope layer 114 to reach back electrode layer 112. Similarly, a further window is required to reach front bus bar 107 through adhesive layer 116, second envelope layer 114, back electrode layer 112, dielectric layer 110 and electroluminescent layer 108. This further window is not illustrated on FIG. 1, being omitted for clarity, but may be seen as item 118B on FIG. 2 in a perspective cross-section view of the present invention.

Figure 2:
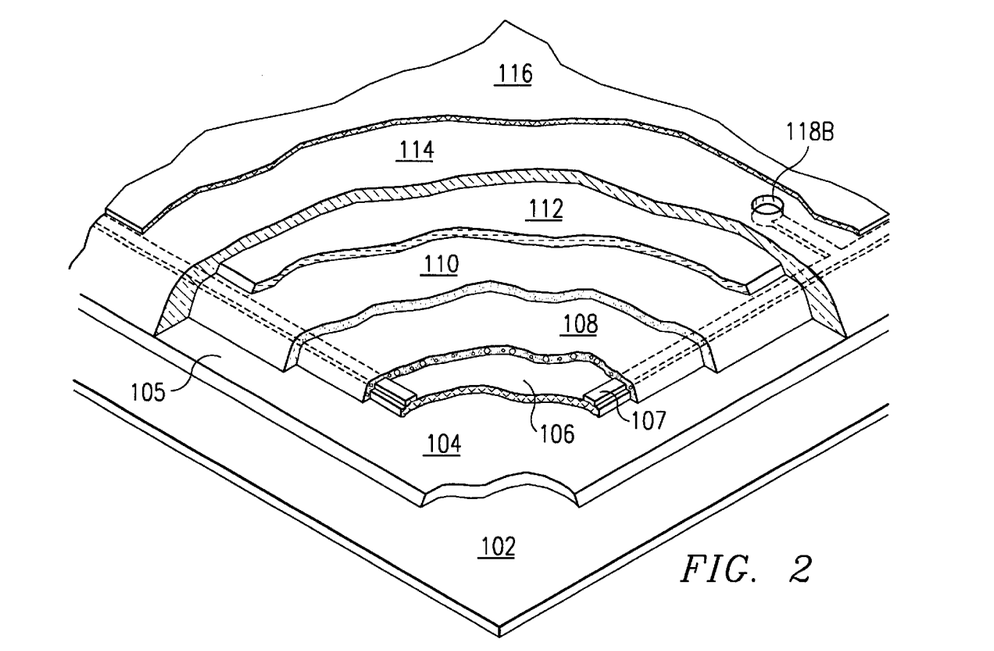
FIG. 2 is a perspective view of the cross-sectional view of FIG. 1.

Turning now to FIG. 2, a perspective view of the cross section depicted in to FIG. 1 is illustrated. First envelope layer 104 is initially printed down onto transfer release paper 102. Border 105 is again evident. ITO layer 106 is printed down onto first envelope layer 104, and front bus bar 107 is printed down onto ITO layer 106. Electroluminescent layer 108 is then printed down onto ITO layer 106 and over front bus bar 107, whereupon dielectric layer I 10 is printed down onto electroluminescent layer 108. Back electrode layer 112 is printed down onto dielectric layer 110, and then the entire assembly is sealed with second envelope layer 114 printed down onto back electrode layer 112 and combining with first envelope layer 104 around border 105. Adhesive layer 116 is then printed down onto second envelope layer 114.

As noted above, FIG. 2 also illustrates front contact window 118B, which will be seen to penetrate all layers through to front bus bar 107 and thereby facilitate the supply of electric power thereto. It will also be seen on FIG. 2 that second envelope layer 114 is disposed to seal the edges of intervening layers above front bus bar 107 within front contact window 118B.

Figure 3:
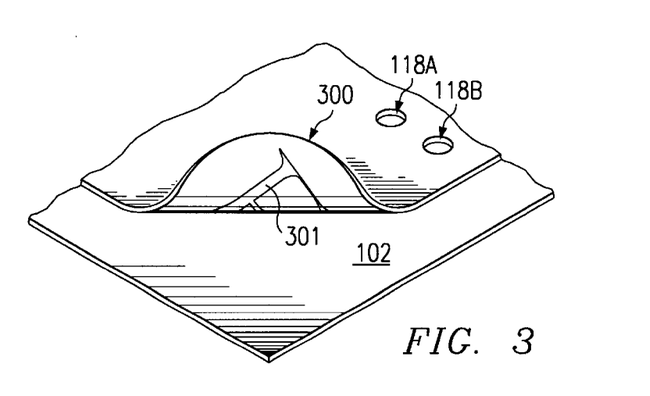
FIG. 3 is a perspective view of an elastomeric EL lamp of the present invention being peeled off transfer release paper 102.

FIG. 3 illustrates the entire assembly as described substantially above after completion and upon readiness to be removed from transfer release paper 102. Elastomeric EL lamp 300 (comprising layers and components 104–116 as shown on FIGS. 1 and 2) is being peeled back from transfer release paper 102 following affixation to a substrate. Back and front contact windows 118A and 118B are also shown.

It will also be appreciated (although not illustrated) that the present invention provides further manufacturing economies over traditional EL lamp manufacturing processes when large number of the same design lamp are required. Screen printing techniques allow multiple EL lamps 300 to be constructed simultaneously on one large sheet of transfer release paper 102. The location of these lamps 300 may be registered on the single sheet of release paper 102, and then simultaneously punched out with a suitable large punch. The individual lamps 300 may then be stored for subsequent use.

As noted above, in accordance with the present invention, the front appearance of elastomeric EL lamp 300 in natural light may also be designed and prepared using dying or other techniques on selected intermediate layers of first envelope layer 104. In accordance with such techniques, FIG. 3 also depicts a first portion of logo 301 being revealed as elastomeric EL lamp 300 is being peeled back. Features and aspects of a preferred preparation of logo 301 will be discussed in greater detail below.

Figure 4:
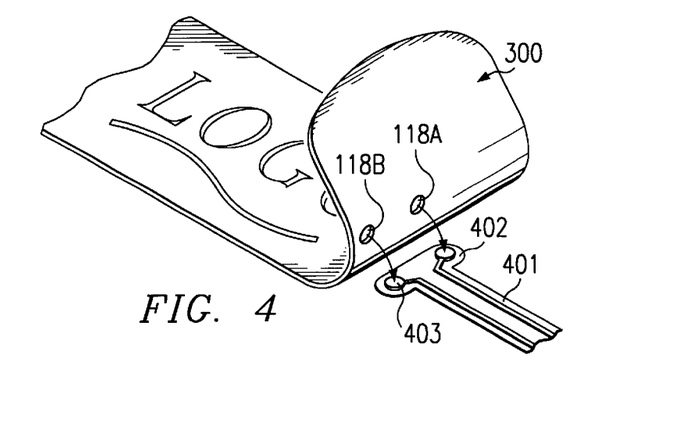
FIG. 4 depicts a preferred method of enabling electric power supply to an elastomeric EL lamp of the present invention.

First, however, there follows further discussion of two alternative preferred means for providing electric power to the elastomeric EL lamp of the present invention. With reference to FIG. 4, elastomeric EL lamp 300 will be seen right side up and rolled back to reveal back and front contact windows 118A and 118B. Electric power is being brought in from a remote source via flexible bus 401, which may, for example, be a printed circuit of silver printed on polyester, such as is known in the art. Alternatively, flexible bus 401 may comprise a conductor (such as silver) printed onto a thin strip of polyurethane. Flexible bus 401 terminates at connector 402, whose size, shape and configuration is predetermined to mate with back and front contact windows 118A and 118B. Connector 402 comprises two contact points 403, one each to be received into back and front contact windows 118A and 118B respectively, and by mechanical pressure, contact points 403 provide the necessary power supply to the EL system within elastomeric EL lamp 300.

In a preferred embodiment, contact points 403 comprise electrically-conductive silicon rubber contact pads to connect the terminating ends of flexible bus 401 to the electrical contact points within back and front contact windows 118A and 118B This arrangement is particularly advantageous when elastomeric EL lamp 300 is being affixed to a substrate by heat adhesive. The heat press used to affix the transfer to the substrate creates mechanical pressure to enhance electrical contact between the silicon rubber contact pads and electrical contact surfaces on contact points 403 and within contact windows 118A and 118B. Electrical contact may be enhanced yet further by applying silicon adhesive between contact surfaces. Enabling silicon rubber contact pads are manufactured by Chromerics, and are referred to by the manufacturer as "conductive silicon rubbers." An enabling silicon adhesive is Chromerics 1030.

A particular advantage of using silicon rubber contact pads is that they tend to absorb relative shear displacement of elastomeric EL lamp 300 and connector 402. Compare, for example, an epoxy glued mechanical joint. The adhesion between transfer 300 and connector 402 would be inherently very strong, but so rigid and inflexible that relative shear displacement between transfer 300 and connector 402 would be transferred directly into either or both of the two components. Eventually, one or other of the epoxy-glued interfaces (epoxy/transfer 300 or epoxy/connector 402) would likely shear off.

In contrast, however, the resilience of the silicon rubber contact pads disposes the silicon rubber interface provided thereby to absorb such relative shear displacement without degeneration of either the pads or the electromechanical joint. The chance is thus minimized for elastomeric EL lamp 300 to lose power prematurely because an electrical contact point has suffered catastrophic shear stresses.

Figure 5:
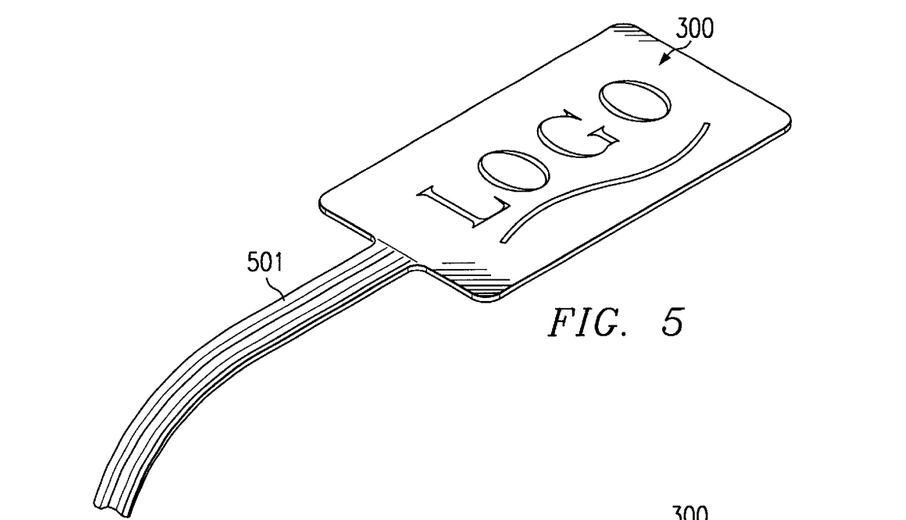
FIG. 5 depicts an alternative preferred method of enabling electric power supply to an elastomeric EL lamp of the present invention.

An alternative preferred means for providing electric power to the EL lamp transfer of present invention is illustrated on FIG. 5. In this case, when front bus bar 107 and back electrode layer 112 are printed down (as described above with reference to FIG. 1) extensions thereto are also printed down beyond the boundaries of elastomeric EL lamp 300 and onto trailing printed bus 501. A suitable substrate for trailing printed bus 501 may be, for example, a "tail" of polyurethane that extends from either first or second envelope layers 104 or 114. Additionally, it will be seen that, if desired, the conductors of trailing printed bus 501 may be sealed within trailing extensions of both first and second envelope layers 104 and 114. Electric power may then be connected remotely from transfer 300 using trailing printed bus 501.

It should be noted that the power supplies in a preferred embodiment use battery/invertor printed circuits with extremely low profiles. For example, a silicon chip-based invertor provides an extremely low profile and size. These power supply components can thus be hidden easily, safely and unobtrusively in products on which elastomeric EL lamps of the present invention are being used. For example, in garments, these power supply components may be hidden effectively in special pockets. The pockets can be sealed for safety (e.g. false linings). Power sources such as lithium 6-volt batteries, standard in the art, will also offer malleability and ductility to enable the battery to fold and bend with the garment. It will be further seen that flexible bus 401 such as is illustrated on FIG. 4, or trailing printed bus 501 such as illustrated on FIG. 5, may easily be sealed to provide complete electrical isolation and then conveniently hidden within the structure of a product.

Turning now to printing techniques, the present invention also discloses improvements in EL lamp printing techniques to develop EL lamps (including elastomeric EL lamps) whose passive natural light appearance is designed to complement the active electroluminescent appearance. Such complementing includes designing the passive natural light appearance of the EL lamp to appear substantially the same as the electroluminescent appearance so that, at least in terms of image and color hue, the EL lamp looks the same whether unlit or lit. Alternatively, the lamp may be designed to display a constant image, but portions thereof may change hue when lit as opposed to unlit. Alternatively again, the outer appearance of the EL lamp may be designed to change when lit.

Printing techniques that may be combined to enable these effects include (1) varying the type of phosphor (among colors of light emitted) used in electroluminescent layer 108, (2) selecting dyes with which to color layers printed down above electroluminescent layer 108, and (3) using dot sizing printing techniques to achieve gradual changes in apparent color hue of both lit and unlit EL lamps.

Figure 6:
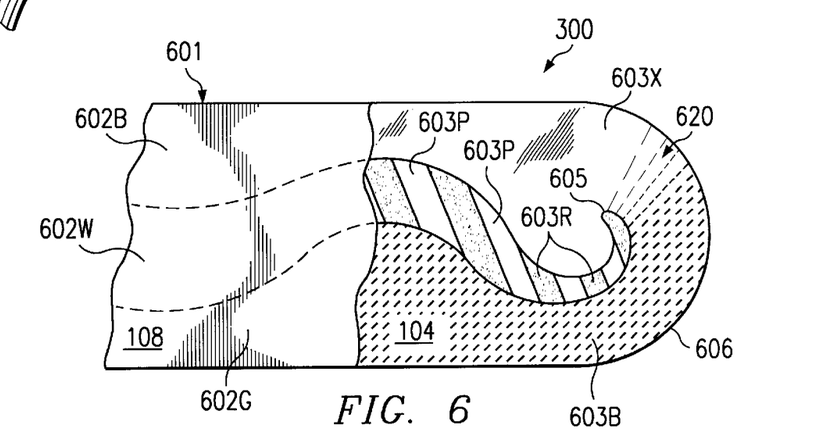
FIG. 6 depicts zones of elastomeric EL lamp 300, with a cutaway portion 601, supporting disclosure herein of various colorizing techniques of layers to create selected unlit/lit appearances.

FIG. 6 illustrates these techniques. A cutaway portion 601 of elastomeric EL lamp 300 reveals electroluminescent layer 108. In cutaway portion 601, three separate electroluminescent zones 602B, 602W and 602G have been printed down, each zone printed using an electroluminescent material containing phosphor emitting a different color of light (blue, white and green respectively). It will be understood that screen printing techniques known in the art may enable the print down of the three separate zones 602B, 602W and 602G. In this way, various zones emitting various light colors may be printed down and, if necessary, combined with zones emitting no light (i.e. no electroluminescent material printed down) to portray any design, logo or information to be displayed when electroluminescent layer 108 is energized.

The outward appearance of electroluminescent layer 108 when energized may then be modified further by selectively colorizing (advantageously, by dying) subsequent layers interposed between electroluminescent layer 108 and the front of the EL lamp. Such selective colorization may be further controlled by printing down colorized layers only in selected zones above electroluminescent layer 108.

Referring again to FIG. 6, elastomeric EL lamp 300 has first envelope layer 104 disposed over electroluminescent layer 108, and as described above with reference to FIGS. 1 and 2, first envelope layer 104 may be printed down to a desired thickness by overlaying a plurality of intermediate layers. One or more of these layers may include envelope layer material dyed to a predetermined color and printed down so that said colorization complements the expected active light appearance from beneath. The result is a desired overall combined effect when the EL lamp is alternatively lit and unlit.

For example, on FIG. 6, suppose that zone 603B is tinted blue, zone 603X is untinted, zones 603R are tinted red and zones 603P are tinted purple. The natural light appearance of elastomeric EL lamp 300 would be, substantially, to have a red and purple striped design 605 with a blue border 606. Red zones 603R and purple zones 603P would modify the white hue of zone 602W beneath, untinted zone 603X would leave unmodified the beige hue of zone 602B beneath, and blue zone 603B would modify the light green/beige hue of zone 602G beneath to give an appearance of a slightly darker blue. It will be appreciated that the blue tint in zone 603B may be further selected so that, when combined with the green of zone 602G beneath, the natural light appearance is substantially the same blue.

When elastomeric EL lamp 300 was energized, however, zones 603R, 603P and 603X would remain red, purple and blue respectively, while zone 603B would turn turquoise as the strong green phosphor light from beneath was modified by the blue tint of zone 603B. Thus, an exemplary effect is created wherein part of the image is designed to be visually the same whether elastomeric EL lamp 300 is lit or unlit, while another part of the image changes appearance upon energizing.

It will thus be appreciated that limitless design possibilities arise for inter-relating the lit and unlit appearances of the lamp by printing down various colorized phosphor zones in combination with various tinted zones above. It will be understood that such lit/unlit appearance design flexibility and scope is not available in traditional EL manufacturing technology, wherein it is difficult to print variously colored "zones" with precision, or as intermediate layers within a monolithic thickness. It will be further understood that such lit/unlit appearance design flexibility and scope has been enabled by the advantage of the present invention and the Previous Invention (above-referenced U.S. patent application Electroluminescent System in Monolithic Structure) to print down entire EL systems, lamps and transfers by screen printing techniques.

It will be further emphasized that in the tinting technique described above, fluorescent-colored dyes are advantageously blended into the material to be tinted, in contrast to use of, for example, a paint or other colorizing layer. Such dying facilitates achieving visually equivalent color hue in reflected natural light and active EL light. Color blending may be enabled either by "trial and error" or by computerized color blending as is known in the art more traditionally, for example, with respect to blending paint colors.

With further reference to FIG. 6, there is further illustrated a transition zone 620 between zones 603B and 603X. It is intended that transition zone 620 represents a zone in which the darker blue hue of zone 603B (when elastomeric EL lamp 300 is energized) transforms gradually into the lighter blue hue of zone 603X. This is a further new and unexpected effect facilitated by the screen printing techniques made available by manufacture of EL systems in accordance with the present invention and the Previous Invention.

It is standard in the print trade to "dot print." Further, this "dot printing" technique will be understood to be easily enabled by screen printing. It is known that "dot printing" enables the borders of two printed neighboring zones to be "fused" together to form a zone in apparent transition. This is accomplished by extending dots from each neighboring zone into the transition zone, decreasing the size and increasing the spacing of the dots as they are extended into the transition zone. Thus, when the dot patterns in the transition zones are overlapped or superimposed, the effect is a gradual change through the transition zone from one neighboring zone into the next.

It will be understood that this effect may easily be enabled on the present invention. With reference again to FIG. 6, a dyed layer providing a particular hue in zone 603B may be printed down with dots extending into transition zone 620 where said dots reduce size and increase spacing as they extend into transition zone 620. A dyed layer providing a particular hue in zone 603X may then be printed down on top with dots extending into transition zone 620 in a reciprocal fashion. The net effect, in both natural and active light, is for transition zone 620 to exhibit a gradual transformation from one hue to the next.

Figure 7:
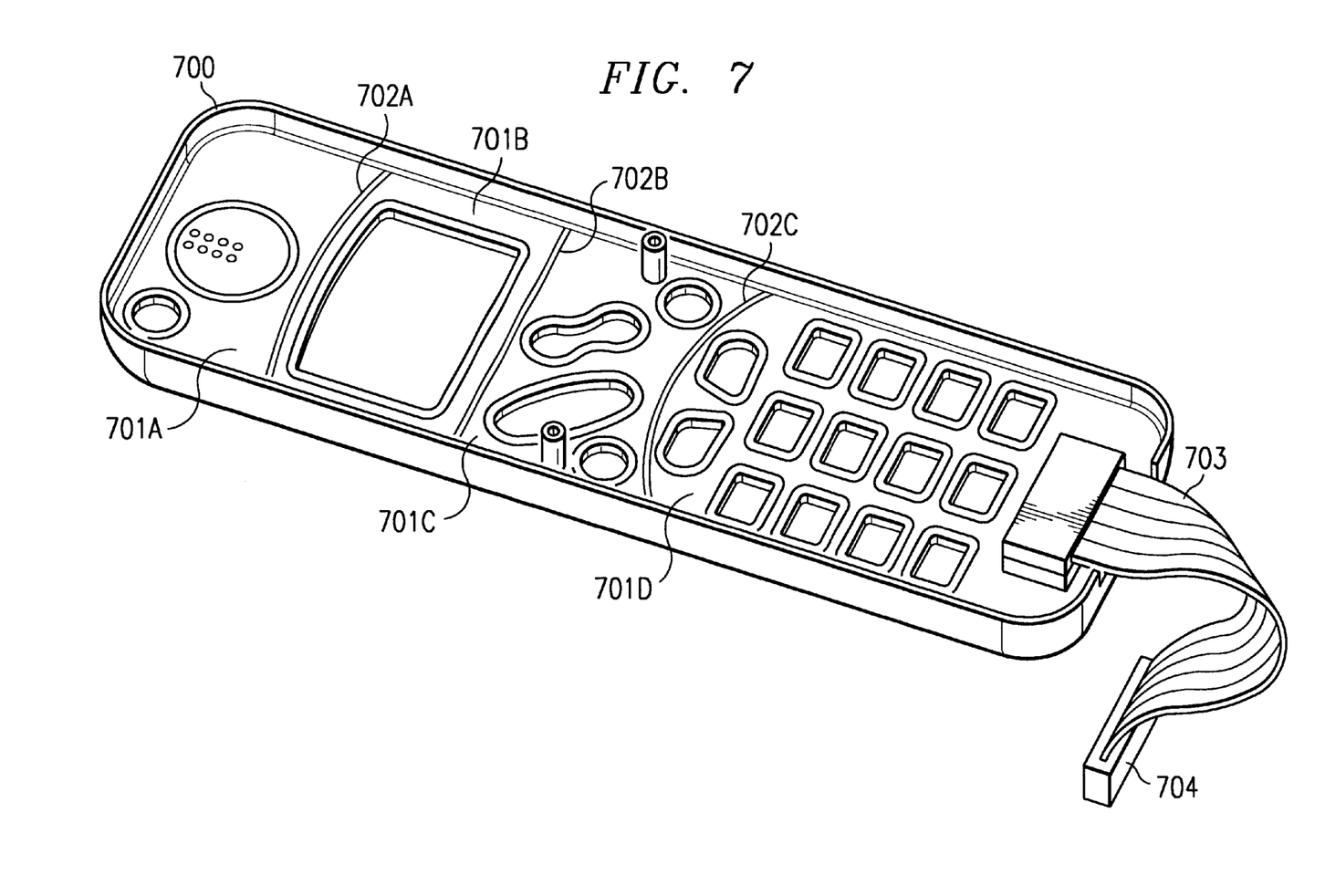
FIG. 7 depicts an embodiment of the present invention deployed on the interior of the case of a telephone handset.

FIG. 7 illustrates an elastomeric electroluminescent lamp constructed according the present invention and deployed on the case of a telephone handset. It will be appreciated that the invention is especially suitable for deployment on such three-dimensional surfaces. It will be further appreciated that although FIG. 7 depicts deployment on a telephone handset, the invention's applications are not in any way limited in this regard. The invention may be applied to just about any apparatus having two- or three-dimensional surfaces upon which an alert is desired.

With further reference to FIG. 7, it will be seen that individual lamp segments 701A, 701B, 701C and 701D are deployed in three-dimensional form on the interior of telephone case 700. As noted, lamp segments 701A through 701D are advantageously membranous electroluminescent lamps constructed according to the disclosure herein. While FIG. 7 shows lamp segments 701A through 701D deployed on the interior of case 700, it will be understood that the invention is not limited in this regard. Lamp segments 701A through 701D may, individually or collectively, be deployed on either the interior or exterior of case 700 with equivalent enabling effect. Advantageously, however, if lamp segments 701A through 701D are interiorly deployed as shown in FIG. 7, case 700 should be clear, tinted, or at least partially transparent, to allow light to shine through from the interior. Correspondingly, if lamp segments 701A through 701D are deployed on the exterior of case 700, a clear or tinted protective coating should advantageously be applied over the lamp segments as deployed on case 700.

As further shown on FIG. 7, lamp segments 701A through 701D are separated by boundaries 702A, 702B and 702C. Lamp segments 701A through 701D are further addressable via circuitry 703. Electric power is delivered to the lamp segments by power supply 704. It will be understood that such power delivery may be in the form of a predetermined pulse so as to cause lamp segments 701A through 701D to light up in a predetermined sequence according to a predetermined script.

In the telephone application as illustrated in FIG. 7, such a script of the illumination of lamp segments 701A through 701D may advantageously be used as a visual alert, energized at preselected times such as when the telephone rings, or receives a page or an e-mail, or at a predetermined date and time corresponding to a previously-selected alarm setting. Alternatively the alert may be energized at the discretion of the user to create a novelty effect.

Further, such a visual alert on a device such as a telephone may be synchronized with an audible alert (not illustrated). Numerous alternative synchronizations are possible, such as energizing the visual alert before, after or during the audible alert. In particular, when the visual and audible alerts are contemporaneous, combined audio/visual effects are available, such as changing the illumination pattern of lamp segments 701A through 701D in synchronicity with predetermined events in the audible alert, such as changes in tone or sound. In this way, if desired the visual alert may adopt a "stroboscopic" effect in synchronicity with the sound of the audible alert.

While not illustrated, it will be appreciated that the audible alert described herein may be generated by methods well known in the art, using analog or digital signals. Further, synchronization of the audible and visual alerts as described herein may be accomplished by processors and control circuitry well known in the art.

Further innovation in developing interesting and varied visual alerts may be enabled by combining preselected tints of case 700, or sections thereof, with predetermined hues in lamp sections 701A through 701D, in the manner described above with reference to FIG. 6.

Although the present invention and its advantages have been described in detail, it should be understood that various changes, substitutions and alterations can be made herein without departing from the spirit and scope of the invention as defined by the appended claims.

I claim:

1. An alerting system, comprising:

a plurality of membranous electroluminescent lamp segments, each lamp segment selectively addressable by a power pulse;

the power pulse, when energized, causing preselected lamp segments to illuminate in patterns changing according to a predetermined script; and the power pulse further energized selectively responsive to a predetermined prompt.

2. The alerting system of claim 1, further comprising:

an audible alert, the audible alert also energized selectively responsive to the predetermined prompt.

3. The alerting system of claim 2, in which:

the audible alert includes a sequence of changes in tone and sound, the changes in tone and sound occurring synchronous with said changes in illumination patterns.

4. The alerting system of claim 1, in which the plurality of lamp segments are deployed on an appliance case.

5. The alerting system of claim 4, in which the appliance is a telephone handset.

6. The alerting system of claim 5, in which the prompt is selected from at least one prompting event in the group consisting of:

(a) an incoming telephone call;

(b) an incoming page;

(c) an incoming e-mail;

(d) recognition of a preselected time and date corresponding to a previously-selected alarm setting; and (e) activation by a user.

7. The alerting system of claim 4, in which selected lamp segments are deployed on an exterior surface of the case, said exteriorly-deployed segments further including a protective outer layer deposited thereon.

8. The alerting system of claim 4, in which selected lamp segments are deployed on an interior surface of the case, portions of the case on which said interiorly-deployed segments are deployed being at least partially transparent to light.

9. The alerting system of claim 8, in which said at least partially transparent portions of the case are colorized to predetermined tints in selected zones thereof.

10. An alerting system, comprising:

a plurality of membranous electroluminescent lamp segments, each lamp segment selectively addressable by a power pulse, wherein an energizing of the power pulse causes preselected lamp segments to illuminate in patterns changing according to a predetermined script;

an audible alert including a sequence of changes in tone and sound, the changes in tone and sound occurring synchronous with said changes in illumination patterns according to said predetermined script; and the power pulse and audible alert energized selectively responsive to a predetermined prompt.

11. The alerting system of claim 10, in which the prompt is selected from at least one prompting event in the group consisting of:

(a) an incoming telephone call;

(b) an incoming page;

(c) an incoming e-mail;

(d) recognition of a preselected time and date corresponding to a previously-selected alarm setting; and (e) activation by a user.

12. The alerting system of claim 10, in which the plurality of lamp segments are deployed on an appliance case.

13. The alerting system of claim 12, in which the appliance is a telephone handset.

14. The alerting system of claim 12, in which selected lamp segments are deployed on an exterior surface of the case, said exteriorly-deployed segments further including a protective outer layer deposited thereon.

15. The alerting system of claim 12, in which selected lamp segments are deployed on an interior surface of the case, portions of the case on which said interiorly-deployed segments are deployed being at least partially transparent to light.

16. The alerting system of claim 15, in which said at least partially transparent portions of the case are colorized to predetermined tints in selected zones thereof.

17. The alerting system of claim 10, in which said changes in illumination patterns cause a stroboscopic effect.

18. An alerting system for a telephone handset, comprising:

a telephone handset having a case;

a plurality of membranous electroluminescent lamp segments interiorly deployed on the case, each lamp segment selectively addressable by a power pulse, the power pulse, when energized, causing preselected lamp segments to illuminate in patterns changing according to a predetermined script;

an audible alert including a sequence of changes in tone and sound, the changes in tone and sound occurring synchronous with said changes in illumination patterns according to said predetermined script;

the power pulse and the audible alert energized selectively responsive to a predetermined prompt; and the predetermined prompt selected from at least one prompting event in the group consisting of:

(a) an incoming telephone call;

(b) an incoming page;

(c) an incoming e-mail;

(d) recognition of a preselected time and date corresponding to a previously-selected alarm setting; and (e) activation by a user.

19. The alerting system of claim 18, in which portions of the case on which said interiorly-deployed segments are deployed are colorized to predetermined tints in selected zones thereof.

20. The alerting system of claim 18, in which said changes in illumination patterns cause a stroboscopic effect.

* * * * *